UNITED STATES PATENT OFFICE.

JOHN DEERE, OF MOLINE, ILLINOIS.

IMPROVEMENT IN CAST-STEEL MOLDS.

Specification forming part of Letters Patent No. 42,172, dated April 5, 1864.

*To all whom it may concern:*

Be it known that I, JOHN DEERE, of Moline, in the county of Rock Island and State of Illinois, have invented a new and useful improvement in compositions for coating the interior of molds for casting steel; and I do hereby declare the following to be a full and correct description of the same.

This composition is an improvement upon the composition for the same purpose described in my patent of January 12, 1864, for casting steel in shapes in dry-sand molds. I have found from practical trials of the simple composition of plumbago dissolved in a solution of fire-clay in water that the castings made in the molds coated with it were so covered with sand as to be difficult and expensive to clean. In obviating this it has been my aim to produce a composition which would perfectly protect the interior of the mold from injury by the pouring of the metal, be sufficiently permeable to allow of the ready escape of the gases evolved in the operation, and yet so completely shield the surface of the casting from contact with sand as to bring it out clean and perfect from the mold. I have secured these objects to a great degree by the use, in the manner hereinafter described, of a composition consisting of the following ingredients, in about the proportions named: To half a bushel of good molding-sand add one quart of finely-pulverized bituminous coal. After placing the pattern in the flask sift this mixture upon it to about the depth of half an inch. When the mold is finished and the pattern withdrawn the interior of the mold is to be coated by means of a very soft brush with the following mixture: Take finely-powdered coke, charcoal, and plumbago in the proportion of 5 (five) of coke, 1 (one) of charcoal, and 14 (fourteen) of plumbago, and mix them to about the consistence of cream with a solution of fire-clay in water, to which may be added a little beer or molasses to increase the adhesiveness of the sand when necessary. After being coated on the interior with this composition, the molds are to be baked and used in the manner set forth in my patent before alluded to, being particularly careful to perforate the mold freely with wire in the manner therein described to allow of the rapid escape of the gases.

Having thus fully described my invention what I claim, and desire to secure by Letters Patent, is—

The peculiar composition herein described for coating the interior surfaces of molds of dry sand to be used in casting steel into shapes.

The above specification of my said invention signed and witnessed at Washington this 22d day of March, A. D. 1864.

JOHN DEERE.

Witnesses:
CHAS. F. STANSBURY,
GEORGE W. VINTON.